(12) United States Patent
Verma et al.

(10) Patent No.: US 11,573,812 B2
(45) Date of Patent: Feb. 7, 2023

(54) GENERATING A NEXT BEST ACTION RECOMMENDATION USING A MACHINE LEARNING PROCESS

(71) Applicant: Oracle International Corporation, Redwood Shores, CA (US)

(72) Inventors: Abhishek Verma, Foster City, CA (US); Michael Richard Palmeter, San Francisco, CA (US); Simon Chow, San Francisco, CA (US); Satheesh Kumar Reddy Challaveera, Hyderabad (IN); Trevor Mathers, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 182 days.

(21) Appl. No.: 16/741,376

(22) Filed: Jan. 13, 2020

(65) Prior Publication Data

US 2021/0081227 A1 Mar. 18, 2021

Related U.S. Application Data

(60) Provisional application No. 62/900,612, filed on Sep. 15, 2019.

(51) Int. Cl.
*G06N 20/00* (2019.01)
*G06F 9/451* (2018.01)

(52) U.S. Cl.
CPC ............ *G06F 9/453* (2018.02); *G06N 20/00* (2019.01)

(58) Field of Classification Search
CPC ............ A63F 2300/6027; G06F 9/453; G06F 16/9535; H04N 1/00509
See application file for complete search history.

(56) References Cited

U.S. PATENT DOCUMENTS

| 9,792,017 | B1* | 10/2017 | Landefeld | ........... G06F 3/04845 |
| 2007/0244768 | A1* | 10/2007 | Nguyen | ............. G06Q 30/0641 |
| | | | | 705/26.81 |
| 2012/0137201 | A1* | 5/2012 | White | .................... G06F 16/957 |
| | | | | 715/205 |
| 2013/0178195 | A1* | 7/2013 | Luna | ..................... H04W 28/06 |
| | | | | 455/414.1 |
| 2013/0238783 | A1* | 9/2013 | Alexander | ............ G06F 16/954 |
| | | | | 709/224 |

(Continued)

*Primary Examiner* — Jennifer N Welch
*Assistant Examiner* — Amy P Hoang
(74) *Attorney, Agent, or Firm* — Invoke

(57) ABSTRACT

Techniques for determining a Next Best Action (NBA) are disclosed, with the determination being based on a position within an application, past actions by a user when experiencing a similar application context, and/or tasks in queue for the user to execute from current state of the application. Techniques are also disclosed for displaying an interface that includes the NBA in conjunction with a specific rationale for presenting the NBA, such as recommendations by a trusted person, based on the user's and/or other users' past behavior, and descriptions developed based on the specific NBA. Also, methods for determining a best NBA are disclosed, with the NBA being selected by applying static rules to a data set, heuristically analyzing the data set, and/or applying a machine learning model to the data set.

23 Claims, 9 Drawing Sheets

(56) References Cited

U.S. PATENT DOCUMENTS

| | | | |
|---|---|---|---|
| 2013/0297927 A1* | 11/2013 | Bora | G06F 9/4451 |
| | | | 713/100 |
| 2016/0004629 A1* | 1/2016 | Bharara | G06F 11/079 |
| | | | 714/38.1 |
| 2016/0104067 A1* | 4/2016 | Xu | H04L 67/306 |
| | | | 706/46 |
| 2017/0038845 A1* | 2/2017 | Chi | G06F 3/017 |
| 2017/0295260 A1* | 10/2017 | Pierce | G06F 9/445 |
| 2018/0164959 A1* | 6/2018 | Gupta | G06Q 10/109 |
| 2019/0235726 A1* | 8/2019 | Vasudev | H04L 67/22 |
| 2020/0167834 A1* | 5/2020 | Matsuoka | G06N 3/08 |

\* cited by examiner

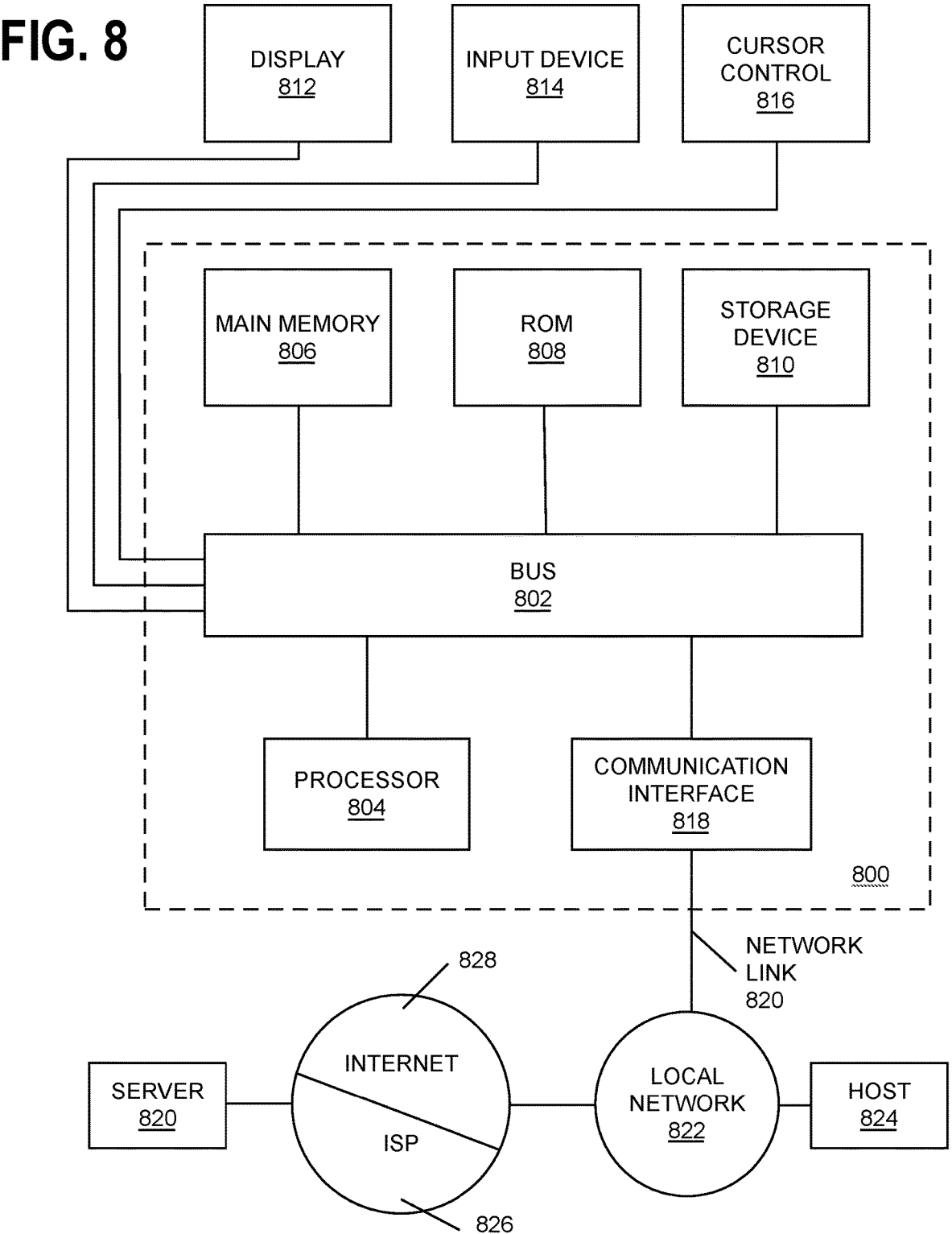

GENERATING A NEXT BEST ACTION RECOMMENDATION USING A MACHINE LEARNING PROCESS

CLAIM OF BENEFIT TO PRIOR APPLICATIONS

This application claims the benefit of U.S. Provisional Patent Application 62/900,612, filed on Sep. 15, 2019, which is hereby incorporated by reference.

TECHNICAL FIELD

The present disclosure relates to providing recommendations for a user of a computing device. In particular, the present disclosure relates to providing a next best action recommendation in a business system using a machine learning process.

BACKGROUND

An enterprise application typically includes interfaces that display and provide navigational capability to users. This allows the users to move between the various functions and content provided by the enterprise application. In some cases, different functions and different content types may be provided with their own set of pages. Therefore, the enterprise application may include a large amount of pages from which the user needs to navigate in order to access the different content and functions of the enterprise application.

One of the key challenges that any enterprise application normally faces is to provide a user interface that not only responds to user selections efficiently, but also loads and renders all components of the user interface on a given page quickly. Page rendering time plays a significant role in user experience and any degradation in performance, such as due to a complex computational model supporting the user interface components, may deter customers from adopting and using the enterprise application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 shows a block diagram that illustrates a computer system, in accordance with one or more embodiments.

DETAILED DESCRIPTION

Figure 1:
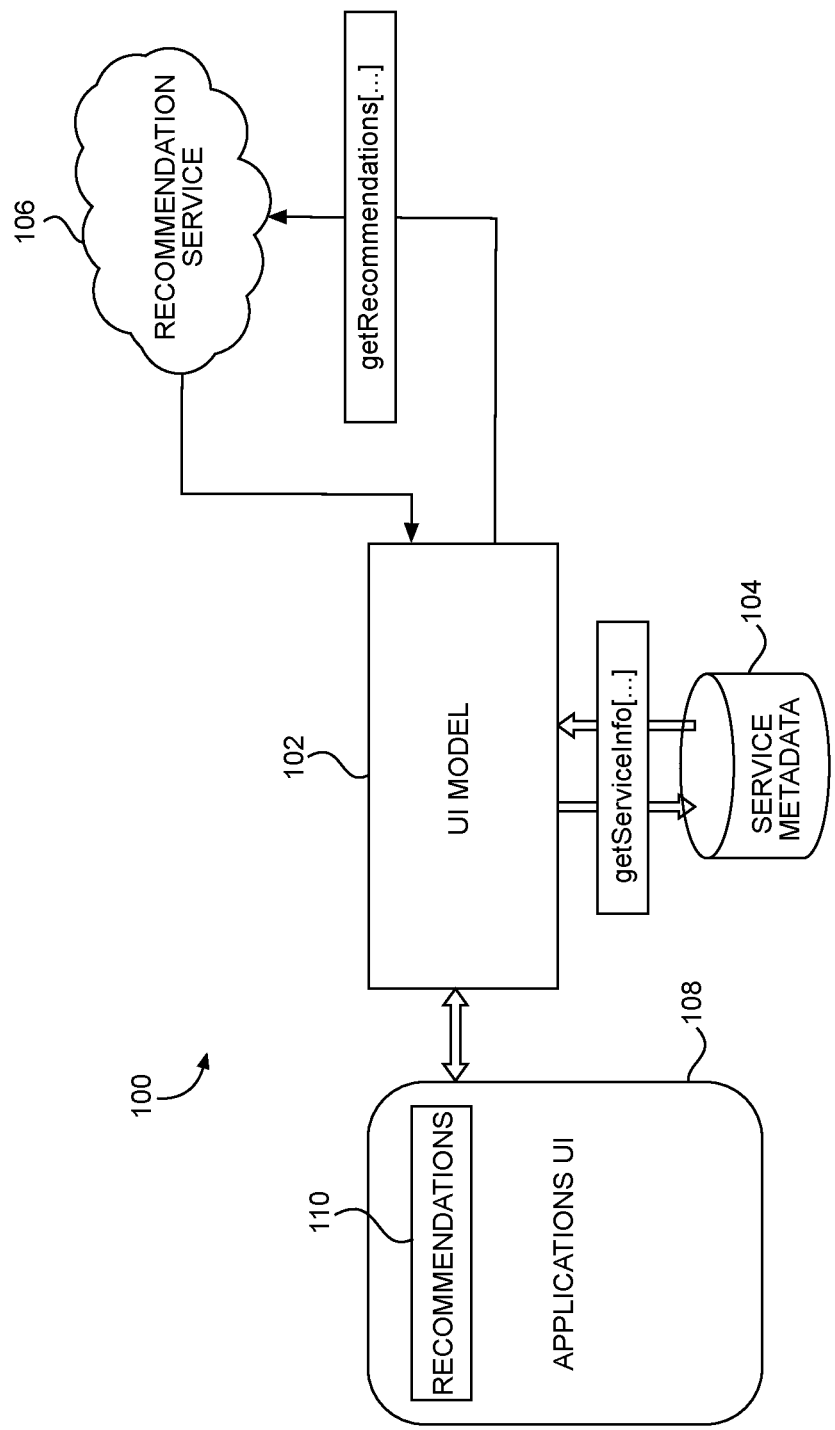
FIG. 1 illustrates an example system for providing next best action (NBA) recommendations to a user, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. NEXT BEST ACTION DETERMINATION
2.1 CURRENT APPLICATION CONTEXT
2.2 USER INTERACTION STATISTICS
2.3 CANDIDATE ACTIONS
2.4 SELECTING A NEXT BEST ACTION
3. MACHINE LEARNING MODEL
3.1 SELECTING FROM AMONGST CANDIDATE ACTIONS
3.2 SELECTING A RECOMMENDATION FROM DIFFERENT MODELS
4. INTERFACE FOR PRESENTING A NEXT BEST ACTION
5. EXAMPLE EMBODIMENTS
5.1 DETERMINING A NEXT BEST ACTION BASED ON A CURRENT APPLICATION CONTEXT
5.2 PROVIDING AN INTERFACE THAT SHOWS A NEXT BEST ACTION IN CONJUNCTION WITH A CORRESPONDING RATIONALE
5.3 DETERMINING WHICH NEXT BEST ACTION TO SELECT BASED ON A MACHINE LEARNING MODEL
6. COMPUTER NETWORKS AND CLOUD NETWORKS
7. MISCELLANEOUS; EXTENSIONS
8. HARDWARE OVERVIEW

1. GENERAL OVERVIEW

While most conventional enterprise applications provide support for users to perform their day-to-day tasks efficiently, very few enterprise applications have the ability to understand user behavior and support user navigation in real time. As more and more enterprise applications try to embed intelligence into the application itself and provide users with insights into the particular business model being supported by the enterprise application, there are very few solutions that can support new user interface (UI) requirements. The following disclosed methods and systems provide an approach that can be used to build such an enterprise application, which is responsive to user demands and interactions, while still presenting the most accurate information based on artificial intelligence (AI) services and machine learning (ML) models deployed and operating, such as in a cloud environment or remote from the enterprise application installation site.

One or more embodiments for determining a Next Best Action (NBA) are disclosed, with the determination being based on a position within an application, past actions by a user when experiencing a similar application context, and/or tasks in queue for the user to execute from current state of the application. One or more embodiments include displaying an interface that includes the NBA in conjunction with a specific rationale for presenting the NBA, such as recommendations by a trusted person, based on the user's and/or other users' past behavior, and descriptions developed based on the specific NBA. Also, methods for determining a best NBA are described in one or more embodiments, with the NBA being selected by applying static rules to a data set, heuristically analyzing the data set, and/or applying a ML model to the data set.

One or more embodiments described in this Specification and/or recited in the claims may not be included in this General Overview section.

2. NEXT BEST ACTION DETERMINATION

FIG. 1 illustrates an example system 100 for providing NBA recommendations to a user, in accordance with one or more embodiments. As illustrated in FIG. 1, system 100 includes a UI generation engine 102, a data repository 104, a recommendation service 106, an application UI 108, and NBA recommendations 110 provided to the application.

In one or more embodiments, system 100 may include more or fewer elements than the elements illustrated in FIG. 1. For example, system 100 may also include the application, an operating system on which the application is being run, a computing device executing the various modules and engines of system 100, etc.

The UI generation engine 102 may be implemented as software, hardware, or a combination thereof. It is configured to generate and provide one or more application UIs 108 to the application for display thereof. An example application UI 108 is described in more detail in FIG. 4 in accordance with one embodiment.

The UI generation engine 102 is also configured to receive recommendations from the recommendation service 106, store the recommendations to the data repository 104, retrieve stored recommendations from the data repository 104, determine one or more best recommendations for a user to perform at any given time, and transmit the NBA recommendation(s) 110 to the application for display to the application UI 108, in accordance with one or more embodiments. In one embodiment, the UI generation engine 102 may store and/or retrieve metadata related to the various recommendations in the data repository 104, for searching, analyzing, and intelligently determining a NBA recommendation 110 based on one or more factors.

In one or more embodiments, data repository 104 may be used to store information for system 100, such as recommendations for analysis to determine one or more NBA recommendations 110 to provide to the application, and may be any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as system 100. Alternatively or additionally, data repository 104 may be implemented or executed on a computing system separate from system 100. Data repository 104 may be communicatively coupled to any device for transmission and receipt of data via a direct connection or via a network.

In an embodiment, system 100 may be implemented on one or more computing systems and/or digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Data and information for use by system 100 may be received and/or obtained from multiple applications and/or devices. Multiple elements may be combined into one element. Operations described with respect to one element may instead be performed by another element in some approaches.

2.1 Current Application Context

The system 100, such as UI generation engine 102 and/or recommendation service 106 in one or more embodiments, is configured to determine a current context of the application on which the application UI 108 is displayed. This current application context may relate to what id displayed to the application in the application UI 108, user interaction with the application UI 108 (such as clicks, touches, page scrolling, sub-applications launched and/or currently operating, past actions, etc.). All of this information may be stored and/or retrieved from the data repository 104 for use in making a NBA recommendation 110 to the application.

The current application context, in one embodiment, may include one or more images displayed to the application UI 108, one or more text descriptions displayed to the application UI 108, and one or more functions that the application is configured to execute based on current content displayed to the application UI 108, among other possible aspects, characteristics, and/or functionality of the application at a current time (e.g., when the NBA recommendation 110 is provided to the application).

2.2 User Interaction Statistics

The system 100, such as UI generation engine 102 and/or recommendation service 106 in one or more embodiments, is also configured to determine user interaction statistics from the application. These user interaction statistics may be a collection, set, or other grouping of data that represents an accumulation of how the user has been interacting with the application over one or more previous periods of time.

In one or more embodiments, the user interaction statistics may include, but are not limited to, any of the following: one or more previous actions taken by the user when experiencing a same or similar application context when using the application, one or more previous actions taken by one or more users (who may be using a different instance of the application remote from the user and/or remote from system 100) similar to the user of the application when experiencing the same or similar application context, one or more previous actions taken by one or more users in a same group (e.g., works in the same team for the same company, employed by the same company or organization, has a same or similar profession, located in the same geographical area, same or similar age, etc.) as the user when experiencing the same or similar application context, one or more options (e.g., windows to open, links to select, information to analyze, etc.) available for the user to execute from the current application context of the application, and one or more tasks in queue for the user to perform based on the current application context. All of this information may be stored and/or retrieved from the data repository 104 for use in making a NBA recommendation to the application.

2.3 Candidate Actions

The system 100, such as UI generation engine 102 and/or recommendation service 106 in one or more embodiments, is also configured to determine one or more candidate actions that are available for the user to execute based on the current application context. Each candidate action may be determined based on any of the factors discussed herein, such as being based on the user interaction statistics corresponding to the current application context.

2.4 Selecting a Next Best Action

Once the set of candidate actions are determined, the system 100 is configured to select a NBA recommendation 110 to present to the user, from amongst all of the candidate actions that may be executed from the application based on the current application context.

Moreover, system 100, such as UI generation engine 102 and/or recommendation service 106 in one or more embodiments, is configured to generate the application UI 108 for display via the application that includes a shortcut for executing the NBA recommendation 110 without displaying any shortcut for executing any other actions that may be requested from the current application context. In this way, only the NBA recommendation is displayed to avoid cluttering the interface.

Additional embodiments and/or examples relating to computer networks which may be used to receive and/or transmit information using system 100 are described below in Section 6, titled "Computer Networks and Cloud Networks."

Examples of operations for determining NBA recommendations for user action are described below with reference to FIG. 5.

Figure 2:
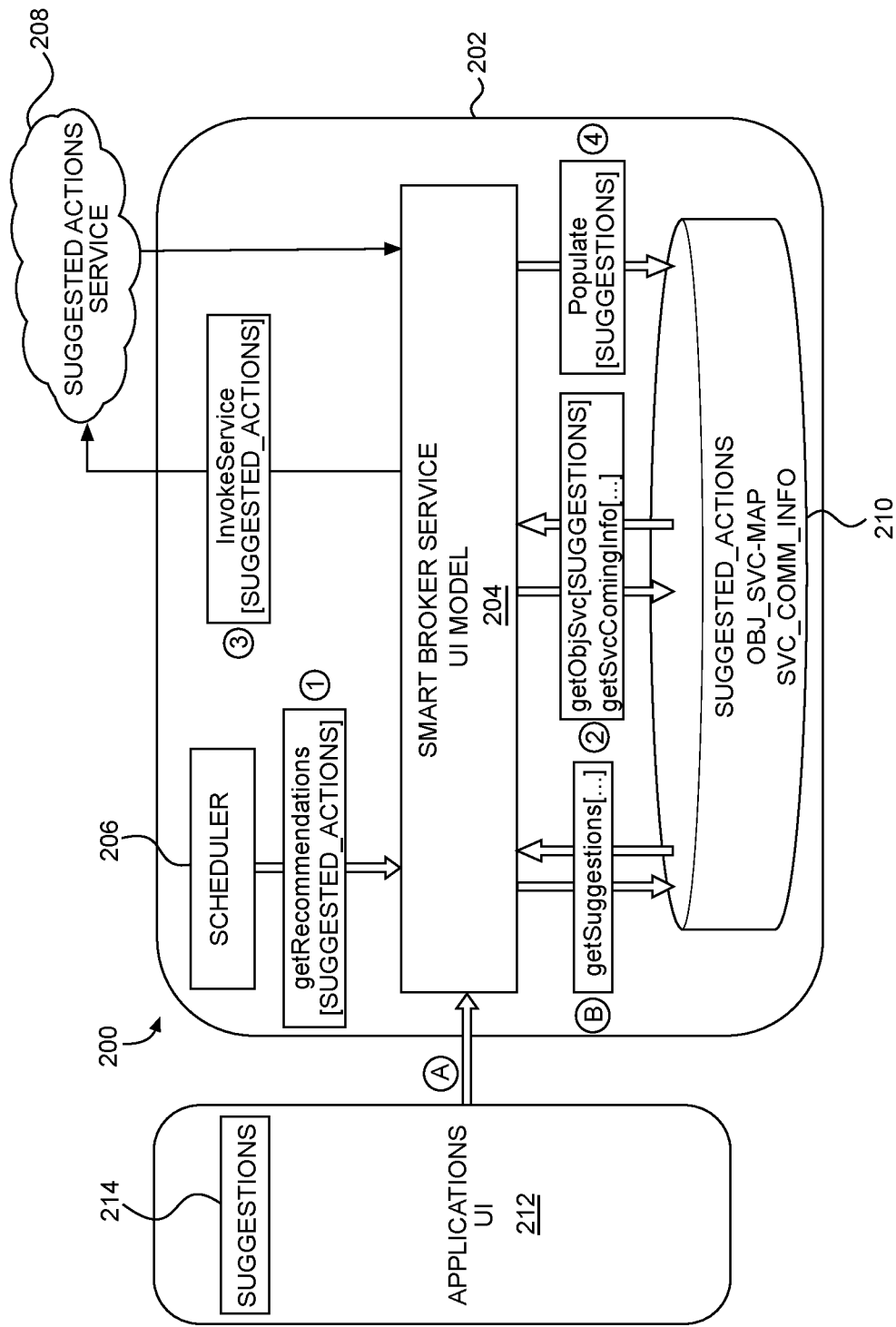
FIG. 2 illustrates an example system for providing NBA recommendations to a user, in accordance with one or more embodiments.

FIG. 2 illustrates an example system 200 for providing NBA recommendations to a user, in accordance with one or more embodiments. As illustrated in FIG. 2, system 200 includes a computing device 202 having a hardware processor, a UI generation engine 204, a scheduler engine 206, a recommendation service 208, a data repository 210, an application UI 212, and NBA recommendations 214 provided to the application.

In one or more embodiments, system 200 may include more or fewer elements than the elements illustrated in FIG. 2. For example, system 200 may also include the application, an operating system on which the application is being run, a computing device executing the application, etc.

The UI generation engine 204 may be implemented as software, hardware, or a combination thereof. It is configured to generate and provide one or more application UIs 212 to the application for display thereof. An example application UI 212 is described in more detail in FIG. 4 in accordance with one embodiment.

The UI generation engine 204 is configured to receive recommendations from the recommendation service 208, store the recommendations to the data repository 210, retrieve stored recommendations from the data repository 210, determine one or more best recommendations for a user to perform at any given time, and transmit the NBA recommendation(s) 214 to the application for display to the application UI 212, in accordance with one or more embodiments. In one embodiment, the UI generation engine 204 may store and/or retrieve metadata related to the various recommendations in the data repository 210, for searching, analyzing, and intelligently determining a NBA recommendation 214 based on one or more factors.

In one or more embodiments, data repository 210 may be used to store information for system 200, such as recommendations for analysis to determine one or more NBA recommendations 214 to provide to the application, and may be any type of storage unit and/or device (e.g., a file system, database, collection of tables, or any other storage mechanism) for storing data. Further, data repository 210 may include multiple different storage units and/or devices. The multiple different storage units and/or devices may or may not be of the same type or located at the same physical site. Further, data repository 210 may be implemented or may execute on the same computing system as system 200. Alternatively or additionally, data repository 210 may be implemented or executed on a computing system separate from system 200. Data repository 210 may be communicatively coupled to any device for transmission and receipt of data via a direct connection or via a network.

In an embodiment, system 200 may be implemented on one or more computing systems and/or digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware NAT, a hardware load balancer, a mainframe, a television, a content receiver, a set-top box, a printer, a mobile handset, a smartphone, a PDA, a wireless receiver and/or transmitter, a base station, a communication management device, a router, a switch, a controller, an access point, and/or a client device.

Data and information for use by system 200 may be received and/or obtained from multiple applications and/or devices. Multiple elements may be combined into one element. Operations described with respect to one element may instead be performed by another element in some approaches.

The system 200, such as UI generation engine 204 and/or recommendation service 106 in one or more embodiments, is also configured to determine user interaction statistics from the application. These user interaction statistics may be a collection, set, or other grouping of data that represents an accumulation of how the user has been interacting with the application over one or more previous periods of time.

Additional embodiments and/or examples relating to computer networks which may be used to receive and/or transmit information using system 200 are described below in Section 6, titled "Computer Networks and Cloud Networks."

3. MACHINE LEARNING MODEL

System 100 and/or 200, as shown in FIGS. 1-2, are configured to analyze the recommendations provided by the recommendation services using a ML model (e.g., artificial intelligence) to determine a best action to recommend to the user for display in the application UI.

There are at least two discrete functions provided by the ML model: selecting from amongst all candidate actions to determine a NBA, and selecting a NBA recommendation from different recommendations provided by multiple recommendation models.

Figure 3A:
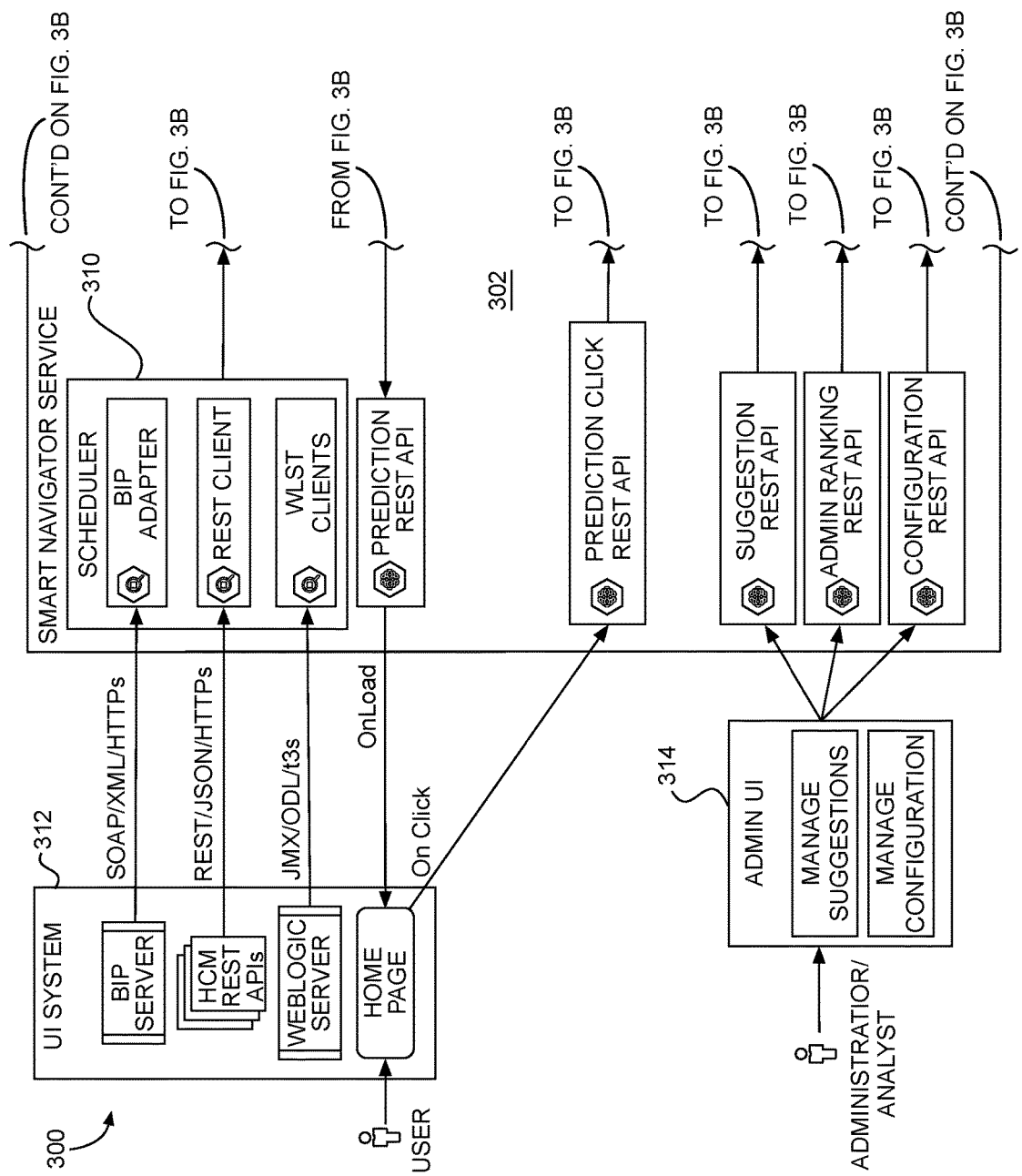
FIGS. 3A-3B illustrate an example system for providing NBA recommendations to a user, in accordance with one or more embodiments.
Figure 3B:
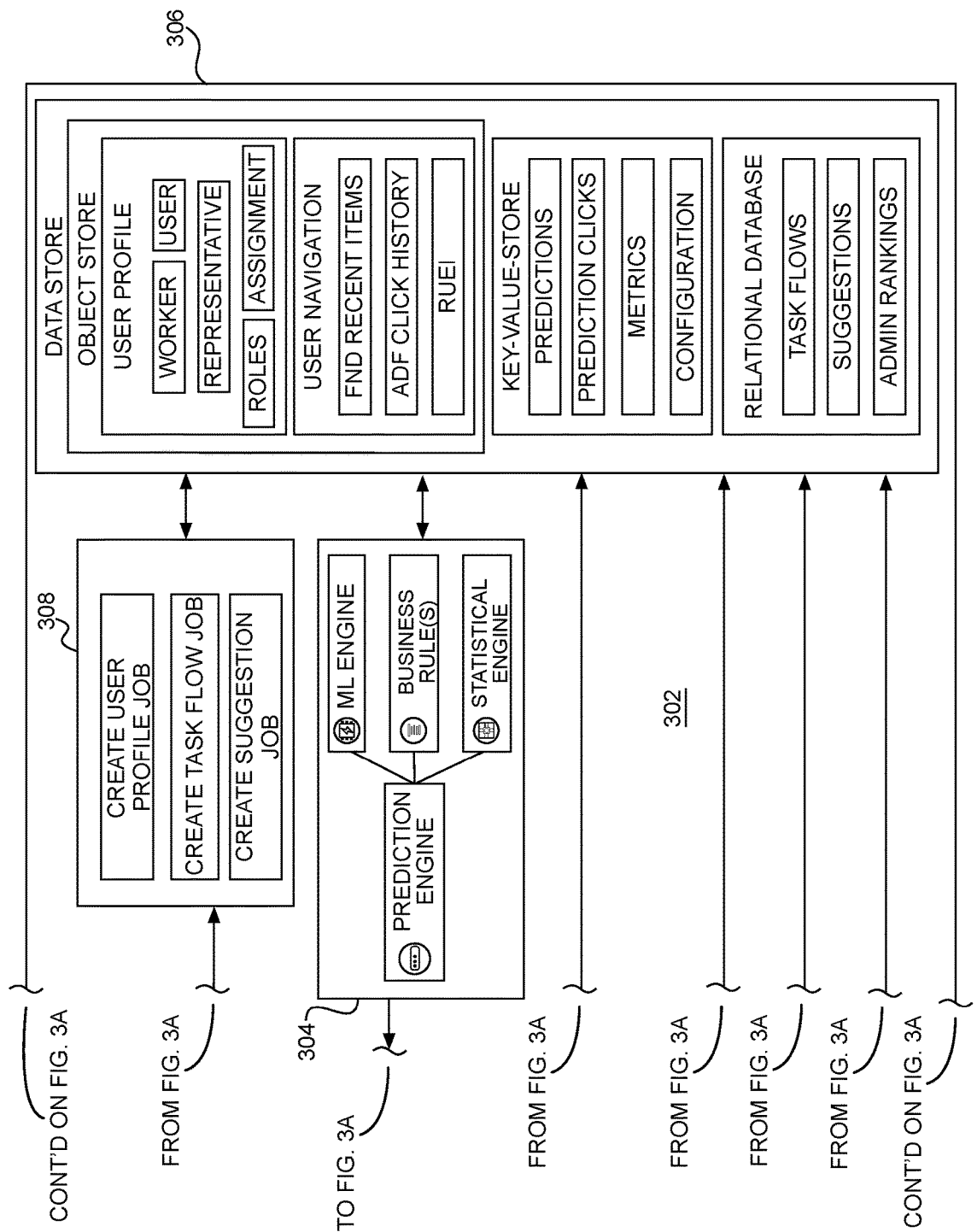

FIGS. 3A-3B illustrate an example system 300 for providing NBA recommendations to a user, in accordance with one or more embodiments. As illustrated in FIGS. 3A-3B, system 300 includes a navigation engine 302, an application 312, and an administrator interface 314.

The application 312 may include any number of functions and/or capabilities, such as servers and/or engines for establishing and/or utilizing application programming interfaces (APIs), transmitting and receiving requests, queries, data, etc., and an application UI for displaying information and receiving interactions with a user of the application.

The administrator interface 314 is configured to provide access to the navigation engine 302 to any authorized administrator of the system 300, and may be configured to manage recommendations (how recommendations are chosen, how many recommendations are displayed, etc.), set and/or change system configurations, etc.

The navigation engine 302, in one or more embodiments, may include a prediction engine 304 utilizing one or more ML models, a data repository 306, a creation engine 308, and a scheduler engine 310. In one or more embodiments, system 300 may include more or fewer elements than the elements illustrated in FIGS. 3A-3B.

In one or more embodiments, data repository 306 may be used to store information for system 300, such as recommendations for analysis to determine one or more NBA recommendations to provide to the application 312, and may be any type of storage unit and/or device (e.g., a file system, database, collection of tables, or any other storage mechanism) for storing data. Further, data repository 306 may include multiple different storage units and/or devices. The multiple different storage units and/or devices may or may not be of the same type or located at the same physical site. Further, data repository 306 may be implemented or may execute on the same computing system as system 300. Alternatively or additionally, data repository 306 may be implemented or executed on a computing system separate from system 300. Data repository 306 may be communicatively coupled to any device for transmission and receipt of data via a direct connection or via a network.

In one embodiment, data repository 306 includes an object store for storing user profiles (relation to enterprise, role(s) within enterprise, assignment(s), task(s), etc.) and user navigation actions (objects selected, clicks, advanced user interaction analytics, user interaction statistics, etc.). In one or more approaches, data repository 306 includes a database for storing recommendations that have been generated, how the user interacted with those recommendations when presented to the user via the application 312, statistics related to how accurate the recommendations have been for each user interacting with the application 312 and other similar users interacting with other instances of the application, and configuration information for determining future recommendations. In more embodiments, data repository 306 includes a relational database for storing task flows, recommendations, and any administrator-specific information (such as recommendation rankings, disallowed recommendations, etc.).

The creation engine 308, in one or more embodiments, is configured to create user profile(s), create task flows for specific users, and create candidate recommendations for further analysis by the prediction engine 304. These candidate recommendations may include, in simplest form, every available action, task, and option available to a user based on a current application context. In some embodiments, this group of candidate recommendations may be further refined to include recommendations most likely to be selected by the user, as described herein in various embodiments.

The scheduler engine 310 is configured to ingest commands and requests from the application 312, such as via one or more APIs, to provide interaction for the user operating the application 312 and any updates/modifications necessitated by user actions within the application 312. The scheduler engine 310 is also configured to determine which commands and/or requests are most pertinent and need priority for analysis, while lowering the priority on any commands and/or requests which do not need immediate attention.

The prediction engine 304, in one or more embodiments, is configured to intelligently analyze data to provide one or more NBA recommendations to the user of the application 312. In order to provide this functionality, the prediction engine 304 may include a ML engine, one or more sets of static rules, and a statistical engine. The prediction engine 304 is described in more detail below.

In an embodiment, system 300 may be implemented on one or more computing systems and/or digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware NAT, a hardware load balancer, a mainframe, a television, a content receiver, a set-top box, a printer, a mobile handset, a smartphone, a PDA, a wireless receiver and/or transmitter, a base station, a communication management device, a router, a switch, a controller, an access point, and/or a client device.

Data and information for use by system 300 may be received and/or obtained from multiple applications and/or devices. Multiple elements may be combined into one element. Operations described with respect to one element may instead be performed by another element in some approaches.

Additional embodiments and/or examples relating to computer networks which may be used to receive and/or transmit information using system 300 are described below in Section 6, titled "Computer Networks and Cloud Networks."

Examples of operations for determining an NBA recommendation based on a ML model are described below with reference to FIGS. 5 and 7.

3.1 Selecting from Amongst Candidate Actions

The prediction engine 304 is configured to apply one or more sets of static rules to application specific data, such as a current application context, in order to determine a NBA recommendation from amongst the candidate recommendations generated by the creation engine 308 or some other portion of system 300.

The static rules may be created by the user, an administrator, automatically by system 300 as default, or by system 300 in response to some setting, configuration, request, and/or command provided to system 300 via the application 312 and/or the administrator interface 314.

In one approach, the static rules may be utilized to select a NBA recommendation from amongst the set of candidate recommendations whenever an amount of data available to system 300 for making predictions is below a lower threshold amount of data, such as at startup of system 300 and/or application 312. Moreover, the lower threshold may be user-defined and/or set automatically by the prediction engine 304 or some other portion of system 300.

In one embodiment, the lower threshold may be measured by a time period, such as having at least one day's worth, one week's worth, one month's worth, etc., of user interaction data with application 312.

In one or more embodiments, the prediction engine 304 is configured to analyze user interaction statistics, such as frequency of choices made by the user(s), clicks over time, pages viewed, etc., to select a NBA recommendation from amongst the set of candidate recommendations.

In one approach, the user interaction statistics may be analyzed to determine the NBA recommendation whenever an amount of data available to system 300 for making predictions is below an upper threshold amount of data, such as prior to acquiring a sufficient amount of data to accurately operate the ML engine. Moreover, the upper threshold may be user-defined and/or set automatically by the prediction engine 304 or some other portion of system 300.

In one embodiment, the upper threshold may be measured by a time period, such as having at least one week's worth of data, one month's worth, 3 month's worth, 6 month's worth, etc., of user interaction data with application 312.

In one or more embodiments, the prediction engine 304 is configured to operate a ML model to select a NBA recommendation from amongst the set of candidate recommendations. In one approach, the ML engine may be operated to determine the NBA recommendation whenever an amount of data available to system 300 for making predictions is at or above the upper threshold amount of data.

The ML engine may rely on multiple sources of data to make predictions, such as user interaction statistics, accuracy of past recommendations, source from which the recommendation originated, etc.

3.2 Selecting a Recommendation from Different Models

The prediction engine 304 is configured to select from amongst all provided NBA recommendation candidates that are provided by the ML engine, the statistical analysis engine, and by application of one or more sets of static rules. In order to make such a decision, the prediction engine 304 may analyze how frequently a user selected past NBA recommendations, when they were provided, what the application context was when they were provided, etc., in order to train itself as to how to make better predictions to aid the user in accessing portions of the application 312 which may require attention.

The ML engine may rely on multiple sources of data to make predictions, such as user interaction statistics, accuracy of past recommendations, source from which the recommendation originated, etc.

4. INTERFACE FOR PRESENTING A NEXT BEST ACTION

Figure 4:
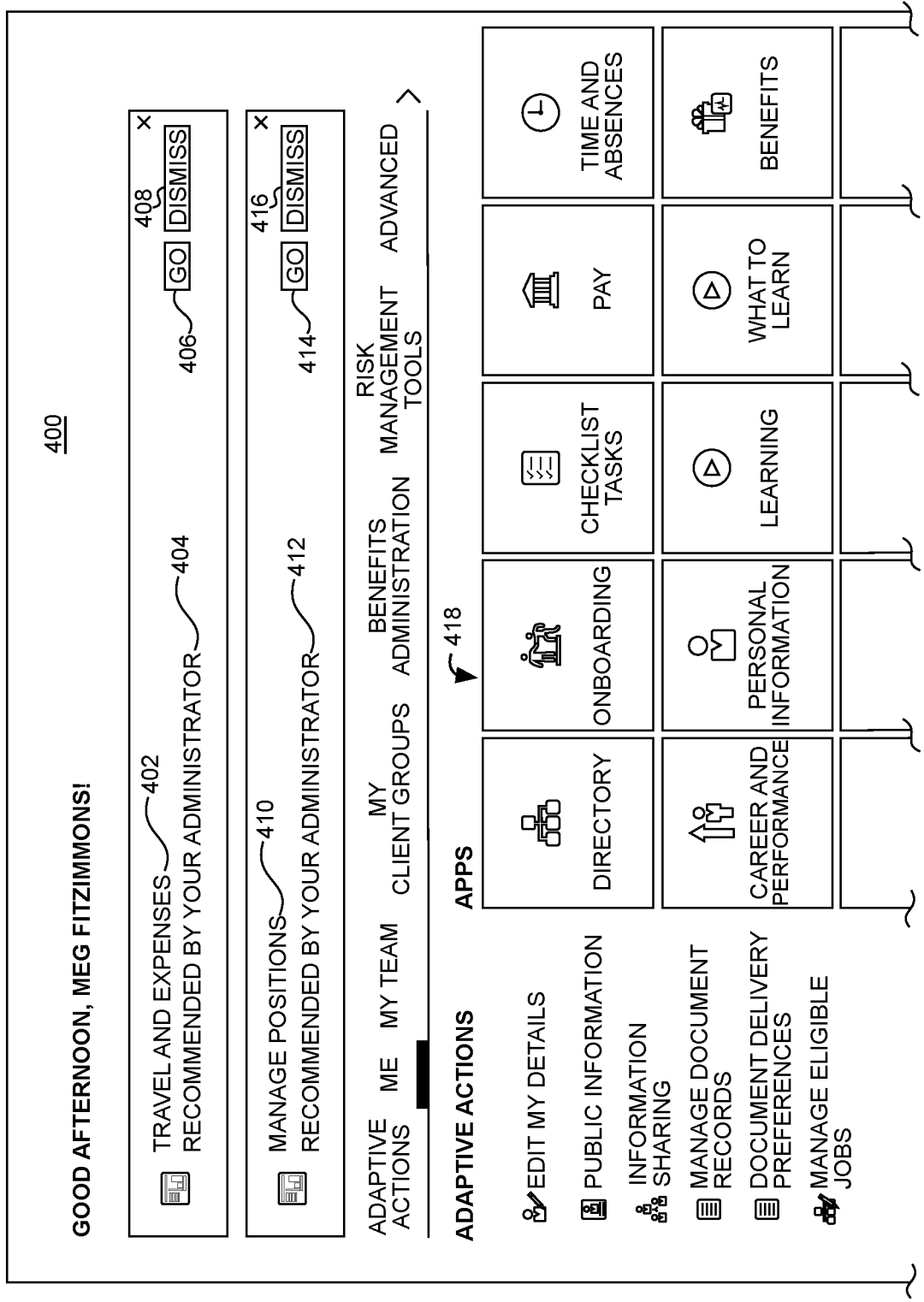
FIG. 4 illustrates an interface for providing NBA recommendations to a user, in accordance with one or more embodiments.

FIG. 4 illustrates an interface 400 for presenting a next best action recommendation in accordance with one or more embodiments. As illustrated in FIG. 4, a first recommendation 402 is shown as a selectable link, along with a first rationale 404 displayed in conjunction with the first recommendation 402 that describes how and/or why the recommendation is being presented on the interface 400. In addition, a button 406 for following the recommendation is provided, along with a second button 408 to dismiss the recommendation, indicating that the user does not wish to perform the recommended action. By selecting the text of the first recommendation 402, the user may be shown additional information relevant to the recommendation and/or proceed to perform the action associated with the first recommendation 402.

The interface 400 also includes a second recommendation 410 displayed as a selectable link, along with a second rationale 412 displayed in conjunction with the second recommendation 410 that describes how and/or why the recommendation is being presented on the interface 400. In addition, a button 414 for following the recommendation is provided, along with a second button 416 to dismiss the recommendation, indicating that the user does not wish to perform the recommended action. By selecting the text of the second recommendation 410, the user may be shown additional information relevant to the recommendation and/or proceed to perform the action associated with the second recommendation 410.

Although two NBA recommendations are shown, any number may be displayed based on settings for the application and/or a total number of recommendations available to be displayed.

In one or more embodiments, the interface 400 may include more or fewer elements than the elements illustrated in FIG. 4. For example, the interface 400 may include a number of sub-applications 418 to launch from the interface 400. These sub-applications 418 may be sorted, filtered, organized, or some other way structured to effectively display the sub-applications 418 for selection by the user.

Data and information for use by the interface 400 may be received and/or obtained from multiple applications and/or devices. Multiple elements may be combined into one element. Operations described with respect to one element may instead be performed by another element in some approaches.

Additional embodiments and/or examples relating to computer networks which may be used to receive and/or transmit information via the interface 400 are described below in Section 6, titled "Computer Networks and Cloud Networks."

In an embodiment, the interface 400 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware NAT, a hardware load balancer, a mainframe, a television, a content receiver, a set-top box, a printer, a mobile handset, a smartphone, a PDA, a wireless receiver and/or transmitter, a base station, a communication management device, a router, a switch, a controller, an access point, and/or a client device.

Examples of operations for determining an NBA recommendation based on a machine learning model are described below with reference to FIG. 7.

In one or more embodiments, an interface may refer to hardware and/or software configured to facilitate communications between a user and a computing device. The interface may render user interface elements and receives input via user interface elements. Examples of an interface include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the interface may be specified in different languages. The behavior of user interface elements is specified in a dynamic programming language, such as JavaScript. The content of user interface elements may be specified in a markup language, such as hypertext markup language (HTML) or XML User Interface Language (XUL). The layout of user interface elements is specified in a style sheet language, such as Cascading Style Sheets (CSS). Alternatively, the interface may be specified in one or more other languages, such as Java, C, or C++.

5. EXAMPLE EMBODIMENTS

5.1 Determining a Next Best Action Based on a Current Application Context

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
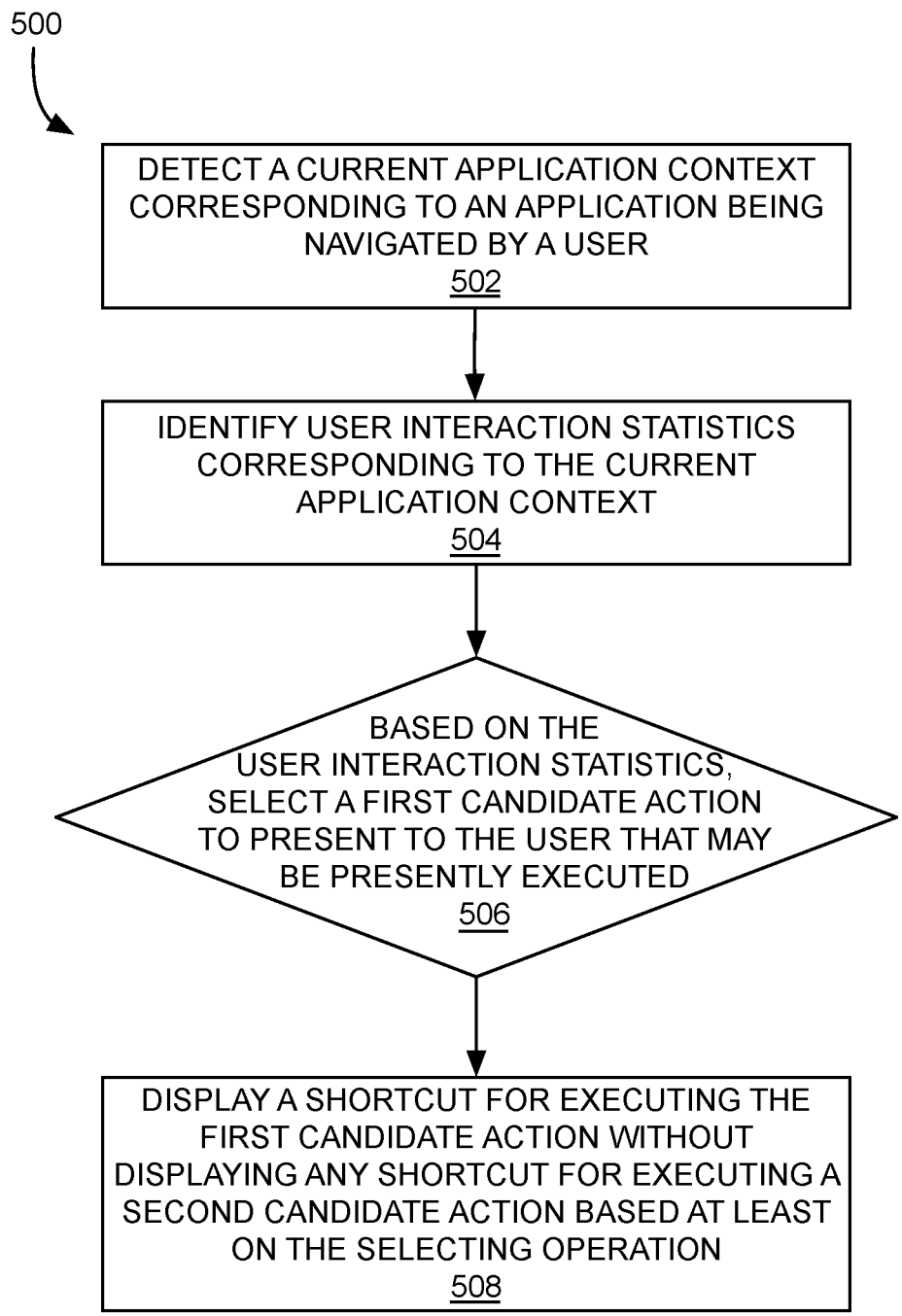
FIG. 5 illustrates an example method for determining NBA recommendations for user action, in accordance with one or more embodiments.

FIG. 5 illustrates an example method 500 for determining NBA recommendations for user action in accordance with one or more embodiments. Method 500, in one embodiment, may be performed by at least one hardware device that includes a hardware processor. One or more operations illustrated in FIG. 5 may be modified, rearranged, or omitted all together. Accordingly, the particular sequence of operations illustrated in FIG. 5 should not be construed as limiting the scope of one or more embodiments.

In operation 502, a current application context corresponding to an application being navigated by a user is detected. The current application context may include, but are not limited to, any of the following: one or more images displayed to a GUI of the application, one or more text descriptions displayed to the GUI, and one or more functions that the application is configured to execute based on current content displayed to the GUI.

In operation 504, user interaction statistics corresponding to the current application context are identified. In one or more embodiments, the user interaction statistics may be determined from any of the following: one or more previous actions taken by the first user when experiencing a same or similar application context, one or more previous actions taken by one or more users similar to the first user when experiencing the same or similar application context, one or more previous actions taken by one or more users in a same group as the first user when experiencing the same or similar application context, one or more options available for the first user to execute from the current application context of the application, and one or more tasks in queue for the first user to perform based on the current application context.

In operation 506, a first candidate action is selected based on the user interaction statistics corresponding to the current application context. The first candidate action is selected to be presented to the user, from a set of candidate actions that may be executed from the current application context.

In operation 508, a shortcut for executing the first candidate action is displayed without displaying any shortcut for executing a second candidate action of the plurality of candidate actions that may be requested from the current application context. The shortcut for executing the first candidate action is displayed based at least on the selecting operation.

In one or more embodiments, the set of candidate actions may be produced by a ML model configured to intelligently provide candidate actions based on a number of factors, such as past accuracy of provided candidate actions, frequency of NBA recommendations being selected, etc.

In one or more embodiments, the shortcut for executing the first candidate action may include, but is not limited to, a button, a hyperlink, a selectable option in a drop-down menu, a selectable image configured to launch a process upon selection, etc.

In one or more embodiments, method 500 may include displaying a second shortcut for the second candidate action in response to the user dismissing the first candidate action without taking the recommendation. In this way, multiple recommended actions may be presented to the user in series without cluttering the interface with too many NBA recommendations at once.

In one or more embodiments, a non-transitory computer readable medium may store instructions, that when executed by a hardware processor, cause execution of one or more operations of method 500. According to one or more embodiments, a system may include the non-transitory computer readable medium and the hardware processor.

In an alternate embodiment, a method may include determining a current application context of an application being accessed by a first user, with the current application context indicating a locus of the first user within the application, determining a suggested action for the first user by applying a machine learning model to user interaction data, and displaying the suggested action in a graphical user interface.

In this embodiment, the user interaction data may include, but is not limited to, one or more previous actions taken by the first user when experiencing a same or similar application context, one or more previous actions taken by one or more users similar to the first user when experiencing the same or similar application context, one or more previous actions taken by one or more users in a same group as the first user when experiencing the same or similar application context, one or more options available for the first user to execute from the current application context of the application, and one or more tasks in queue for the first user to perform based on the current application context.

In one embodiment, a method for determining NBA recommendations for user action that may be performed by at least one hardware processor includes the following operations. The method includes determining a current application context of an application being accessed by a first user, the current application context indicating a locus of the first user within the application. The method also includes determining a suggested action for the first user by applying a machine learning model to user interaction data, the user interaction data being selected from a group of data that includes: one or more previous actions taken by the first user when experiencing a same or similar application context, one or more previous actions taken by one or more users similar to the first user when experiencing the same or similar application context, one or more previous actions taken by one or more users in a same group as the first user when experiencing the same or similar application context, one or more options available for the first user to execute from the current application context of the application, and one or more tasks in queue for the first user to perform based on the current application context. Moreover, the method includes displaying the suggested action in a GUI.

In one or more embodiments, a non-transitory computer readable medium may store instructions, that when executed by a hardware processor, cause execution of one or more operations of any of the above-described methods. According to one or more embodiments, a system may include the non-transitory computer readable medium and the hardware processor.

5.2 Providing an Interface that Shows a Next Best Action in Conjunction with a Corresponding Rationale A detailed example is described below for purposes of clarity. Components and/or operations described below should be understood as one specific example which may not be applicable to certain embodiments. Accordingly, components and/or operations described below should not be construed as limiting the scope of any of the claims.

Figure 6:
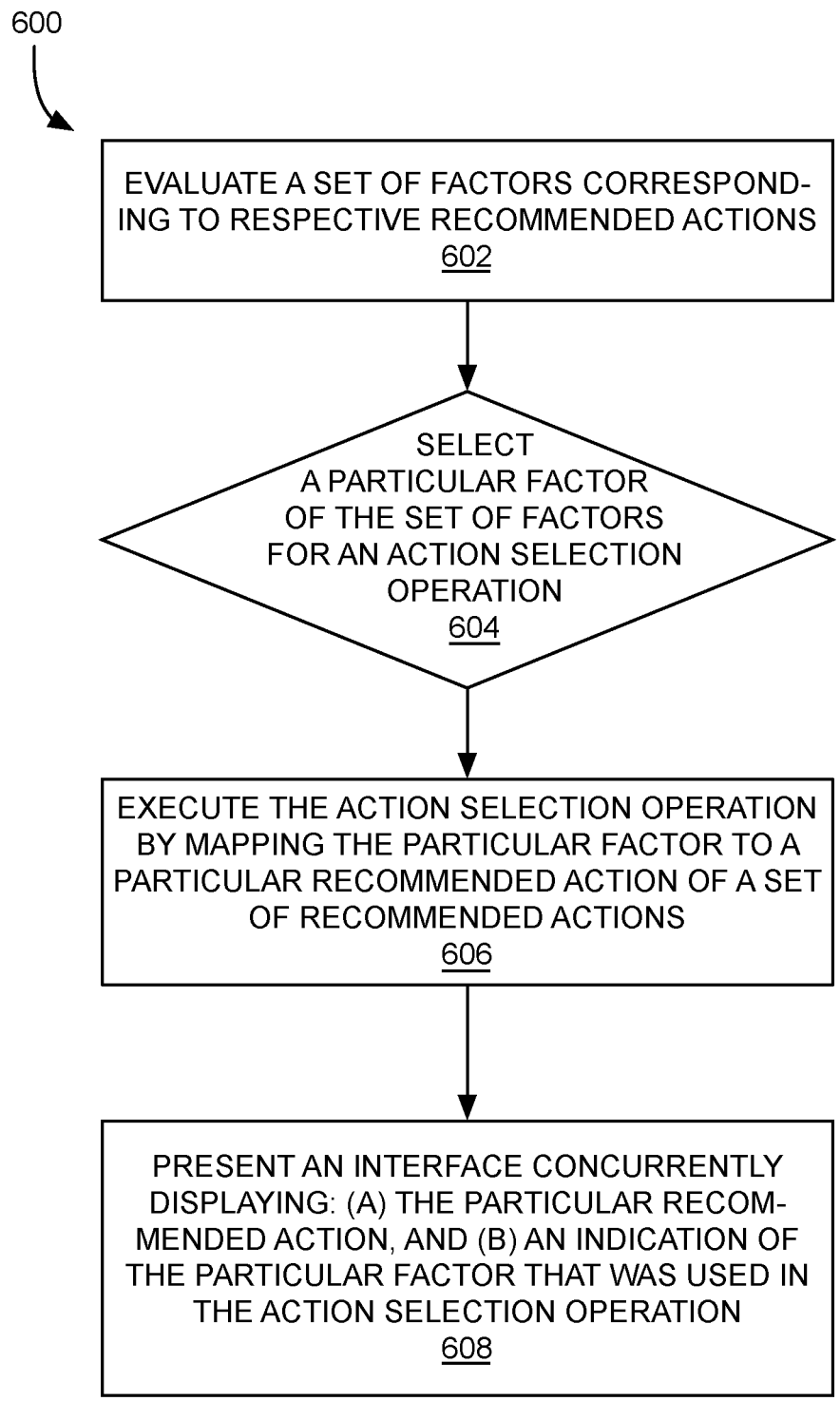
FIG. 6 illustrates an example method for providing an interface that includes an NBA recommendation in conjunction with rationale for providing the NBA, in accordance with one or more embodiments.

FIG. 6 illustrates an example method 600 for providing an interface that includes an NBA recommendation in conjunction with rationale for providing the NBA in accordance with one or more embodiments. Method 600, in one embodiment, may be performed by at least one hardware device that includes a hardware processor. One or more operations illustrated in FIG. 6 may be modified, rearranged, or omitted all together. Accordingly, the particular sequence of operations illustrated in FIG. 6 should not be construed as limiting the scope of one or more embodiments.

In operation 602, some factors are evaluated, each factor corresponding to a respective recommended action of a set of recommended actions. Additionally, at least two factors correspond to two different recommended actions of the set of recommended actions.

In one or more embodiments, the set of factors may include, but is not limited to, a recommendation received from an administrator, manager, and/or teammate of a user (e.g., someone who the user accepts advice from), past behavior of the user in a similar situation, and past behavior of similar users in the similar situation.

In one approach, the past behavior of the user may include the user selecting a particular recommended action when presented with more than one recommended action. In other words, is the recommended action a preferred action for this user.

In an approach, the past behavior of the similar users may include multiple similar users selecting the same particular recommended action when presented with more than one recommended action. Furthermore, in an approach, the past behavior of the similar users may be obtained from one or more second devices external to a device executing method 600.

In operation 604, a particular factor of the set of factors is selected for an action selection operation. In this operation, a most likely rationale may be determined based on the recommended action and the factors available for selecting an action.

In operation 606, the action selection operation is executed, with the action selection operation including mapping the particular factor to a particular recommended action of a set of recommended actions.

In operation 608, an interface is presented that concurrently displays: (a) the particular recommended action, and (b) an indication of the particular factor that was used in the action selection operation.

Method 600 may also include concurrently displaying a description of the particular recommended action in the interface.

According to an alternate embodiment, a method may include presenting a GUI on a display of a computing device, with the GUI including one or more suggested actions to be taken by a user of the computing device based on a current application and a locus of the user within the current application, and for each particular suggested action of the one or more suggested actions: a link configured to access a predetermined portion of the application for performing the particular suggested action, a description of the particular suggested action to be performed by the user, and an indication of how the particular suggested action was determined.

In one embodiment, a method includes presenting a GUI on a display of a computing device. In this embodiment, the GUI includes one or more suggested actions to be taken by a user of the computing device based on a current application and a locus of the user within the current application, and for each particular suggested action of the one or more suggested actions: a link configured to access a predetermined portion of the application for performing the particular suggested action, a description of the particular suggested action to be performed by the user, and an indication of how the particular suggested action was determined.

In one or more embodiments, a non-transitory computer readable medium may store instructions, that when executed by a hardware processor, cause execution of one or more operations of any of the above-described methods. According to one or more embodiments, a system may include the non-transitory computer readable medium and the hardware processor.

5.3 Determining which Next Best Action to Select Based on a Machine Learning Model A detailed example is described below for purposes of clarity. Components and/or operations described below should be understood as one specific example which may not be applicable to certain embodiments. Accordingly, components and/or operations described below should not be construed as limiting the scope of any of the claims.

Figure 7:
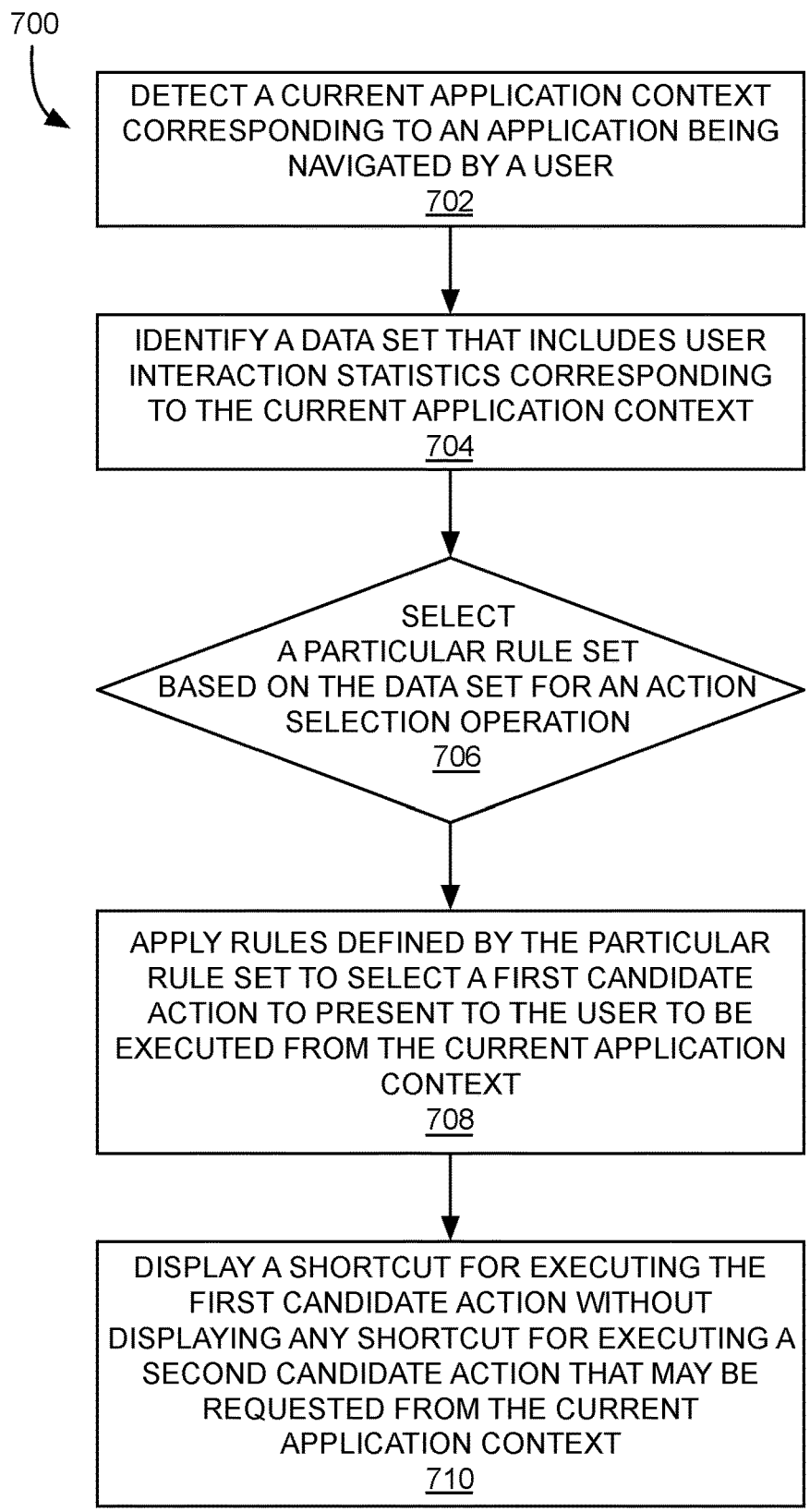
FIG. 7 illustrates an example method for determining an NBA recommendation based on a machine learning model, in accordance with one or more embodiments.

FIG. 7 illustrates an example method 700 for determining an NBA recommendation based on a machine learning model in accordance with one or more embodiments. Method 700, in one embodiment, may be performed by at least one hardware device that includes a hardware processor. One or more operations illustrated in FIG. 7 may be modified, rearranged, or omitted all together. Accordingly, the particular sequence of operations illustrated in FIG. 7 should not be construed as limiting the scope of one or more embodiments.

In operation 702, a current application context corresponding to an application being navigated by a user is detected. In one approach, the current application context may include, but is not limited to, any of the following: one or more images displayed to a GUI of the application, one or more text descriptions displayed to the GUI, and one or more functions that the application is configured to execute based on current content displayed to the GUI.

In operation 704, a data set including user interaction statistics corresponding to the current application context is identified. In one or more embodiments, the user interaction statistics may include, but are not limited to: one or more previous actions taken by the first user when experiencing a same or similar application context, one or more previous actions taken by one or more users similar to the first user when experiencing the same or similar application context, one or more previous actions taken by one or more users in a same group as the first user when experiencing the same or similar application context, one or more options available for the first user to execute from the current application context of the application, and one or more tasks in queue for the first user to perform based on the current application context.

In operation 706, a particular rule set of a plurality of rule sets for an action selection operation is selected based at least on the data set. In an embodiment, the particular rule set may be selected by a ML model configured to intelligently select rule sets based at least on past accuracy of candidate actions provided by each of the rule sets being evaluated.

In one or more embodiments, the ML model generates at least some of the set of candidate actions based on one or more rule sets and stores the generated candidate actions to a remote data repository. Thereafter, the first candidate action is selected from the generated candidate actions stored to the remote data repository.

In operation 708, rules defined by the particular rule set are applied to select a first candidate action, to present to the user, from a set of candidate actions that may be executed from the current application context.

In operation 710, a shortcut is displayed for executing the first candidate action without displaying any shortcut for executing a second candidate action of the plurality of candidate actions that may be requested from the current application context.

In one or more embodiments, the shortcut for executing the first candidate action may include, but is not limited to, a button, a hyperlink, a selectable option in a drop-down menu, a selectable image configured to launch a process upon selection, etc.

In one or more embodiments, method 700 may include displaying a second shortcut for the second candidate action in response to the user dismissing the first candidate action without taking the recommendation. In this way, multiple recommended actions may be presented to the user in series without cluttering the interface with too many NBA recommendations at once.

According to one or more embodiments, the rule sets may include static rules predetermined based on common activities available within the application, heuristically analyzing the data set based on collected information, and applying a machine learning model to the dataset based on certain information.

In an embodiment, collected information may include, but is not limited to, any of the following: one or more previous actions taken by the user when experiencing a same or similar application context, one or more options available for the user to execute from the current application context, and one or more tasks in queue for the user to perform based on the current application context.

According to one embodiment, the certain information may include, but is not limited to, any of the following: one or more previous actions taken by the user when experiencing a same or similar application context, one or more previous actions taken by one or more similar users when experiencing the same or similar application context, one or more previous actions taken by one or more users in a same group as the user when experiencing the same or similar application context, one or more options available for the user to execute from the current application context, and one or more tasks in queue for the user to perform based on the current application context.

In an alternate embodiment, a method may include determining a current application context of an application being accessed by a user, the current application context indicating a locus of the user within the application, and performing at least one action based on an amount of data collected concerning previous user actions. The actions may include applying a set of rules to the current application context to determine a first suggested action, heuristically analyzing a partial dataset to determine a second suggested action, applying a machine learning model to a full dataset to determine a third suggested action. Then, one of the first, second, or third suggested actions is selected to display to the user based on a probability calculation determining which of the first, second, or third suggested actions is most likely to be performed by the user, and the selected suggested action is displayed in a GUI.

The partial dataset includes less than a threshold amount of data therein, and may include any of the following: one or more previous actions taken by the user when experiencing a same or similar application context, one or more options available for the user to execute from the current application context, and one or more tasks in queue for the user to perform based on the current application context.

Additionally, the full data set includes at least the threshold amount of data therein, and may include any of the following: one or more previous actions taken by the user when experiencing a same or similar application context, one or more previous actions taken by one or more similar users when experiencing the same or similar application context, one or more previous actions taken by one or more users in a same group as the user when experiencing the same or similar application context, one or more options available for the user to execute from the current application context, and one or more tasks in queue for the user to perform based on the current application context.

In one or more embodiments, the first candidate action may be performed automatically, without user input, by the system. In an alternate embodiment, the user may be prompted to approve performance of the first candidate action before it is performed by the system. This prompt may be displayed as a pop-up on the display, adjacent or next to the description of the first candidate action, as a selectable button or other graphical element on the display that is indicated as allowing the system to perform the first candidate action, etc.

In accordance with one or more embodiments, at least two of the plurality of candidate actions may be selectively displayed, alone or in conjunction with rationale for choosing the particular candidate actions, for selection by the user. In a further embodiment, two or more of the plurality of rule sets for the action selection operation may be selectively displayed for selection by the user, and in response to selection of one of the rule sets, the candidate actions may be re-ordered according to the selected rule set.

The plurality of candidate actions and/or the plurality of rule sets may be displayed using any known display techniques, such as in a hidden drop-down list or menu that is revealed upon selection of an element (e.g., a button, arrow, etc.) by the user, with radio buttons provided adjacent to each for selection by the user, in a list, etc.

According to a further embodiment, the ability to cause the candidate action to be performed automatically, change the set of rules being applied, and/or to select a different action than the first candidate action may be limited to a subset of users, such as expert users, administrators, etc. The subset of users may be selected based on the stored user profiles which detail the relationship that a user has with the company or enterprise, one or more roles of the user within the company or enterprise, various current and/or past assignments, current and/or past tasks, etc. Moreover, any of these preferences made by a user may be stored as user navigation actions.

In one embodiment, a method includes determining a current application context of an application being accessed by a user, the current application context indicating a locus of the user within the application. The method also includes performing at least one action based on an amount of data collected concerning previous user actions. The action may include applying a set of rules to the current application context to determine a first suggested action, heuristically analyzing a partial dataset to determine a second suggested action (the partial dataset having less than a threshold amount of data therein), and/or applying a machine learning model to a full dataset to determine a third suggested action (the full data set having at least the threshold amount of data therein).

In this embodiment, the partial data set may include one or more previous actions taken by the user when experiencing a same or similar application context, one or more options available for the user to execute from the current application context, and/or one or more tasks in queue for the user to perform based on the current application context. In addition, the full data set may include one or more previous actions taken by the user when experiencing a same or similar application context, one or more previous actions taken by one or more similar users when experiencing the same or similar application context, one or more previous actions taken by one or more users in a same group as the user when experiencing the same or similar application context, one or more options available for the user to execute from the current application context, and/or one or more tasks in queue for the user to perform based on the current application context.

In this embodiment, the method also includes selecting one of the first, second, or third suggested actions to display to the user based on a probability calculation determining which of the first, second, or third suggested actions is most likely to be performed by the user, and thereafter displaying the selected suggested action in a GUI.

In one or more embodiments, a non-transitory computer readable medium may store instructions, that when executed by a hardware processor, cause execution of one or more operations of any of the above-described methods. According to one or more embodiments, a system may include the non-transitory computer readable medium and the hardware processor.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a NAT. Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 820 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    detecting a current application context, from a plurality of application contexts corresponding to an application, being navigated by a first user;
    identifying user interaction statistics corresponding to the current application context;
    based on the user interaction statistics: determining that a likelihood of the first user causing execution of a first candidate action, of a plurality of candidate actions that may be executed from the current application context, exceeds a threshold, wherein the plurality of candidate actions are produced by a machine learning model configured to provide candidate actions based at least on past accuracy of provided candidate actions;
    in response to determining that the likelihood exceeds the threshold: selecting the first candidate action to present to the first user; and
    based at least on selecting the first candidate action: adding, within the current application context, a shortcut for executing the first candidate action without adding any shortcut for executing a second candidate action of the plurality of candidate actions that may be requested from the current application context,
    wherein the method is performed by at least one device including a hardware processor.

2. The method as recited in claim 1, wherein the current application context comprises a context selected from a group comprising:
    one or more images displayed to a graphical user interface (GUI) of the application;
    one or more text descriptions displayed to the GUI; and
    one or more functions that the application is configured to execute based on current content displayed to the GUI.

3. The method as recited in claim 1, wherein the user interaction statistics are determined from data selected from a group comprising:
    one or more previous actions taken by the first user when experiencing a same or similar application context;
    one or more previous actions taken by one or more users similar to the first user when experiencing the same or similar application context;
    one or more previous actions taken by one or more users in a same group as the first user when experiencing the same or similar application context;
    one or more options available for the first user to execute from the current application context of the application; and
    one or more tasks in queue for the first user to perform based on the current application context.

4. The method as recited in claim 1, wherein the shortcut for executing the first candidate action is selected from a group of shortcuts comprising: a button, a hyperlink, a selectable option in a drop-down menu, and a selectable image configured to launch a process upon selection.

5. The method as recited in claim 1, further comprising displaying a second shortcut for the second candidate action in response to the user dismissing the first candidate action.

6. A method comprising:
    identifying a plurality of factors for use in recommending, to a user, actions from respective application contexts;
    selecting a first factor of the plurality of factors for an action selection operation for selecting a recommended action from a plurality of actions executable in a first application context, the first factor comprising past behavior of other users in the first application context;
    executing the action selection operation using the first factor to select a first recommended action, of the plurality of actions, for the first application context; and
    presenting an interface corresponding to the first application context, the interface concurrently displaying: (a) the first recommended action, (b) a description of the first recommended action, and (c) an indication that the first recommended action was selected based on the past behavior of other users in the first application context,
    wherein the method is performed by at least one device including a hardware processor.

7. The method as recited in claim 6, wherein the plurality of factors comprise:
    a recommendation received from an administrator, manager, or teammate of the user;
    past behavior of the user in the first application context; and
    past behavior of similar users in the first application context, the similar users being in a group with the user unrelated to the first application context.

8. The method as recited in claim 7, wherein the past behavior of the user comprises the user selecting a particular recommended action when presented with more than one recommended action.

9. The method as recited in claim 6, wherein the plurality of factors comprise past behavior of similar users in the first application context, the similar users being in a group with the user unrelated to the first application context, and wherein the past behavior of the similar users comprises multiple similar users selecting a same particular recommended action when presented with more than one recommended action.

10. The method as recited in claim 9, wherein the past behavior of the similar users is obtained from one or more second devices external to the at least one device.

11. A method comprising:
    detecting a current application context, from a plurality of application contexts corresponding to an application, being navigated by a user;
    identifying a data set comprising user interaction statistics corresponding to the current application context;
    selecting, based at least on the data set, a particular rule set of a plurality of rule sets for an action selection operation, wherein the particular rule set is selected by a machine learning model configured to select rule sets based at least on past accuracy of candidate actions provided by a selected rule set;

applying rules defined by the particular rule set to select a first candidate action, to present to the user, from a plurality of candidate actions that may be executed from the current application context; and displaying a shortcut for executing the first candidate action without displaying any shortcut for executing a second candidate action of the plurality of candidate actions that may be requested from the current application context, wherein the method is performed by at least one device including a hardware processor.

12. The method as recited in claim 11, wherein the current application context comprises a context selected from a group comprising:

one or more images displayed to a graphical user interface (GUI) of the application;

one or more text descriptions displayed to the GUI; and one or more functions that the application is configured to execute based on current content displayed to the GUI.

13. The method as recited in claim 11, wherein the user interaction statistics are determined from data selected from a group comprising:

one or more previous actions taken by the first user when experiencing a same or similar application context;

one or more previous actions taken by one or more users similar to the first user when experiencing the same or similar application context;

one or more previous actions taken by one or more users in a same group as the first user when experiencing the same or similar application context;

one or more options available for the first user to execute from the current application context of the application; and one or more tasks in queue for the first user to perform based on the current application context.

14. The method as recited in claim 11, wherein the machine learning model generates at least some of the plurality of candidate actions based on one or more rule sets and stores the generated candidate actions to a remote data repository, and wherein the first candidate action is selected from the generated candidate actions stored to the remote data repository.

15. The method as recited in claim 11, wherein the shortcut for executing the first candidate action is selected from a group of shortcuts comprising: a button, a hyperlink, a selectable option in a drop-down menu, and a selectable image configured to launch a process upon selection.

16. The method as recited in claim 11, further comprising displaying a second shortcut for the second candidate action in response to the user dismissing the first candidate action.

17. The method as recited in claim 11, wherein the plurality of rule sets comprise:

static rules predetermined based on common activities available within the application;

heuristically analyzing the data set based on information selected from a group comprising:

one or more previous actions taken by the user when experiencing a same or similar application context;

one or more options available for the user to execute from the current application context; and one or more tasks in queue for the user to perform based on the current application context; and applying a machine learning model to the dataset based on information selected from a group comprising:

one or more previous actions taken by the user when experiencing a same or similar application context;

one or more previous actions taken by one or more similar users when experiencing the same or similar application context;

one or more previous actions taken by one or more users in a same group as the user when experiencing the same or similar application context;

one or more options available for the user to execute from the current application context; and one or more tasks in queue for the user to perform based on the current application context.

18. One or more non-transitory computer-readable media storing instructions, which when executed by one or more hardware processors, cause performance of operations comprising:

detecting a current application context, from a plurality of application contexts corresponding to an application, being navigated by a first user;

identifying user interaction statistics corresponding to the current application context;

based on the user interaction statistics: determining that a likelihood of the first user causing execution of a first candidate action, of a plurality of candidate actions that may be executed from the current application context, exceeds a threshold, wherein the plurality of candidate actions are produced by a machine learning model configured to provide candidate actions based at least on past accuracy of provided candidate actions;

in response to determining that the likelihood exceeds the threshold: selecting the first candidate action to present to the first user; and based at least on selecting the first candidate action: adding, within the current application context, a shortcut for executing the first candidate action without adding any shortcut for executing a second candidate action of the plurality of candidate actions that may be requested from the current application context.

19. A system comprising:

one or more hardware processors;

one or more non-transitory computer-readable media; and program instructions stored on the one or more non-transitory computer-readable media which, when executed by the one or more hardware processors, cause the system to:

detect a current application context, from a plurality of application contexts corresponding to an application, being navigated by a first user;

identify user interaction statistics corresponding to the current application context;

based on the user interaction statistics: determine that a likelihood of the first user causing execution of a first candidate action, of a plurality of candidate actions that may be executed from the current application context, exceeds a threshold, wherein the plurality of candidate actions are produced by a machine learning model configured to provide candidate actions based at least on past accuracy of provided candidate actions;

in response to determining that the likelihood exceeds the threshold: select the first candidate action to present to the first user; and based at least on selecting the first candidate action: add, within the current application context, a shortcut for executing the first candidate action without adding any shortcut for executing a second candidate action of the plurality of candidate actions that may be requested from the current application context.

20. One or more non-transitory computer-readable media storing instructions, which when executed by one or more hardware processors, cause performance of operations comprising:
identifying a plurality of factors for use in recommending, to a user, actions from respective application contexts;
selecting a first factor of the plurality of factors for an action selection operation for selecting a recommended action from a plurality of actions executable in a first application context, the first factor comprising past behavior of other users in the first application context;
executing the action selection operation using the first factor to select a first recommended action, of the plurality of actions, for the first application context; and
presenting an interface corresponding to the first application context, the interface concurrently displaying: (a) the first recommended action, (b) a description of the first recommended action, and (c) an indication that the first recommended action was selected based on the past behavior of other users in the first application context.

21. A system comprising:
one or more hardware processors;
one or more non-transitory computer-readable media; and
program instructions stored on the one or more non-transitory computer-readable media which, when executed by the one or more hardware processors, cause the system to:
identify a plurality of factors for use in recommending, to a user, actions from respective application contexts;
select a first factor of the plurality of factors for an action selection operation for selecting a recommended action from a plurality of actions executable in a first application context, the first factor comprising past behavior of other users in the first application context;
execute the action selection operation using the first factor to select a first recommended action, of the plurality of actions, for the first application context; and
present an interface corresponding to the first application context, the interface concurrently displaying: (a) the first recommended action, (b) a description of the first recommended action, and (c) an indication that the first recommended action was selected based on the past behavior of other users in the first application context.

22. One or more non-transitory computer-readable media storing instructions, which when executed by one or more hardware processors, cause performance of operations comprising:
detecting a current application context, from a plurality of application contexts corresponding to an application, being navigated by a user;
identifying a data set comprising user interaction statistics corresponding to the current application context;
selecting, based at least on the data set, a particular rule set of a plurality of rule sets for an action selection operation, wherein the particular rule set is selected by a machine learning model configured to select rule sets based at least on past accuracy of candidate actions provided by a selected rule set;
applying rules defined by the particular rule set to select a first candidate action, to present to the user, from a plurality of candidate actions that may be executed from the current application context; and
displaying a shortcut for executing the first candidate action without displaying any shortcut for executing a second candidate action of the plurality of candidate actions that may be requested from the current application context.

23. A system comprising:
one or more hardware processors;
one or more non-transitory computer-readable media; and
program instructions stored on the one or more non-transitory computer-readable media which, when executed by the one or more hardware processors, cause the system to:
detect a current application context, from a plurality of application contexts corresponding to an application, being navigated by a user;
identify a data set comprising user interaction statistics corresponding to the current application context;
select, based at least on the data set, a particular rule set of a plurality of rule sets for an action selection operation, wherein the particular rule set is selected by a machine learning model configured to select rule sets based at least on past accuracy of candidate actions provided by a selected rule set;
apply rules defined by the particular rule set to select a first candidate action, to present to the user, from a plurality of candidate actions that may be executed from the current application context; and
display a shortcut for executing the first candidate action without displaying any shortcut for executing a second candidate action of the plurality of candidate actions that may be requested from the current application context.

* * * * *

UNITED STATES PATENT AND TRADEMARK OFFICE
CERTIFICATE OF CORRECTION

PATENT NO. : 11,573,812 B2
APPLICATION NO. : 16/741376
DATED : February 7, 2023
INVENTOR(S) : Verma et al.

It is certified that error appears in the above-identified patent and that said Letters Patent is hereby corrected as shown below:

In the Drawings

On sheet 3 of 9, in FIG. 3A, Line 21, delete "ADMINISTRATIOR/" and insert
-- ADMINISTRATOR/ --, therefor.

In the Claims

In Column 25, Line 26, in Claim 13, before "user" delete "first", therefor.

In Column 25, Line 29, in Claim 13, before "user" delete "first", therefor.

In Column 25, Line 32, in Claim 13, before "user" delete "first", therefor.

In Column 25, Line 34, in Claim 13, before "user" delete "first", therefor.

In Column 25, Line 37, in Claim 13, before "user" delete "first", therefor.

Signed and Sealed this
Nineteenth Day of December, 2023

Katherine Kelly Vidal
*Director of the United States Patent and Trademark Office*